(12) United States Patent
Cannillo

(10) Patent No.: US 11,784,569 B2
(45) Date of Patent: Oct. 10, 2023

(54) EFFICIENT HYBRID BUCK-BOOST CONVERTER

(71) Applicant: Dialog Semiconductor (UK) Limited, London (GB)

(72) Inventor: Francesco Cannillo, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/540,337

(22) Filed: Dec. 2, 2021

(65) Prior Publication Data
US 2023/0091489 A1  Mar. 23, 2023

(30) Foreign Application Priority Data

Sep. 20, 2021 (DE) .................... 102021124195.2

(51) Int. Cl.
*H02M 3/158* (2006.01)
*H02M 1/00* (2006.01)
(52) U.S. Cl.
CPC ....... *H02M 3/1582* (2013.01); *H02M 1/0095* (2021.05)
(58) Field of Classification Search
CPC ............. H02M 7/4837; H02M 7/4835; H02M 3/1582; H02M 3/1584; H02M 3/1586; H02M 3/158; H02M 1/0095
See application file for complete search history.

(56) References Cited

U.S. PATENT DOCUMENTS 10,727,747 B2  7/2020  Macri
10,790,742 B1  9/2020  Petersen
(Continued)

FOREIGN PATENT DOCUMENTS

DE   10 2018 206 918 B3   10/2019
DE   10 2019 214 195 A1   10/2020

OTHER PUBLICATIONS

"A Hybrid Inductor-Based Flying-Capacitor-Assisted Step-Up/Step-Down DC-DC Converter with 96.56% Efficiency," by Yong-Min Ju et al., ISSCC 2017 / Session 10 / DC-DC Converters / 10.4, 2017 IEEE International Solid-State Circuits Conference, Feb. 2017, p. 184.

(Continued)

*Primary Examiner* — Nguyen Tran
(74) *Attorney, Agent, or Firm* — Saile Ackerman LLC; Stephen B. Ackerman

(57) ABSTRACT

A power converter configured to generate an output voltage at an output node of the power converter based on an input voltage received at an input node of the power converter is presented. In particular, the power converter may comprise a first switching element coupled between the input node and a first intermediate node. The converter also has an inductive element coupled between a second intermediate node and the output node, a second switching element with one port being coupled to the second intermediate node and a third switching element and a fourth switching element coupled in series between the output node and a reference node. The converter also has a flying capacitive element coupled between the first intermediate node and a third intermediate node between the third and fourth switching elements and a fifth switching element coupled between the first and second intermediate nodes.

13 Claims, 14 Drawing Sheets

(56) References Cited

U.S. PATENT DOCUMENTS

2019/0341850 A1* 11/2019 Macri ................ H02M 7/4837
2021/0083585 A1* 3/2021 Jiang ................. H02M 7/4837
2021/0159790 A1* 5/2021 Tseng ..................... H02M 1/08

OTHER PUBLICATIONS

German Office Action, File No. 10 2021 124 195.2, Applicant: Dialog Semiconductor (UK) Limited, dated Mar. 4, 2022, 5 pages.

* cited by examiner

EFFICIENT HYBRID BUCK-BOOST CONVERTER

TECHNICAL FIELD

The present disclosure is directed to the general area of power converters, and more particularly to the field of (hybrid) buck-boost (DC-DC) power converters.

BACKGROUND

In the general technical field of Buck-Boost (sometimes also referred to as BuBo for short) DC-DC converters, a major drawback for the power efficiency of a conventional BuBo topology as shown in FIG. 1 may be the presence of two switches (i.e., switches S1 and S3) in the main current path through the inductor. This is the fundamental reason for why the conventional BuBo converter is typically considered to be less efficient of a buck-only or boost-only topology.

A so-called hybrid topology may instead, in some possible implementations, achieve higher efficiency with respect to the conventional BuBo, e.g., by using only one switch in the main current path during its operation phases. However, it should be noted that at least some of the switching elements (e.g., switching devices, switches) of the conventional hybrid buck-boost converters would require bulk switches (or back-to-back switches), in order to guarantee correct operation, which would generally result in high voltage rating (e.g., maximum drain-source voltage $V_{DS\_max}$) for the switches. Generally speaking, a higher voltage rating of the switching devices would translate into a higher specific on-resistance (sometimes also denoted as $R_{SP}$) and, in turn, into a larger silicon area for a given target on-resistance (sometimes also denoted as $R_{ON}$) of the switching devices (e.g., FET switching devices).

SUMMARY

Thus, broadly speaking, the focus of the present disclosure is to propose techniques and/or topologies for (hybrid) buck-boost power converters that can achieve at least the same functionality of conventional power converters, while at the same time also allowing devices with lower voltage rating (e.g., with a lower maximum drain-source voltage) to be used. Moreover, it would also be desirable that the power switching devices do not require bulk-switching scheme (sometimes also referred to as body switching) or back-to-back switching devices in the bulk-boost converter topologies.

In view of the above, the present disclosure generally provides power converters (particularly bulk-boost power converters), as well as corresponding methods for operating such power converters, having the features of the respective independent claims.

According to an aspect of the disclosure, it is provided a power converter configured to generate (e.g., convert) an output voltage at an output node of the power converter based on an input voltage received at an input node of the power converter.

In particular, the power converter may comprise a first switching element (or switching device) coupled (e.g., connected or directly coupled) between the input node and a first intermediate node. The power converter may further comprise an inductive element (e.g., an inductor) coupled (e.g., connected or directly coupled) between a second intermediate node and the output node. The power converter may yet further comprise a second switching element with one port or terminal (e.g., a drain port of a MOSFET) being coupled (e.g., connected or directly coupled) to the second intermediate node. The power converter may further comprise a third switching element and a fourth switching element coupled (e.g., connected or directly coupled) in series between the output node and a reference node. The reference node may be ground (GND), or any other suitable reference node, as will be understood and appreciated by the skilled person. In addition, the power converter may also comprise a flying capacitive element (e.g., a flying capacitor) coupled (e.g., connected or directly coupled) between the first intermediate node and a third intermediate node that is between the third and fourth switching elements. Finally, the power converter may comprise a fifth switching element coupled (e.g., connected or directly coupled) between the first and second intermediate nodes. Notably, any switching elements/devices mentioned in this disclosure may be transistor devices, such as FETs, MOSFETs, etc., or any other suitable switching devices, as will be understood and appreciated by the skilled person.

Configured as proposed above, the buck-boost converters of the present disclosure may generally achieve (at least) the same functionality of the conventional power converters, while allowing devices with lower voltage rating (e.g., a lower maximum drain-source voltage) to be used. Moreover, the power switching devices in the present disclosure would generally not require bulk-switching scheme (body switching) or back-to-back devices. As can be understood and appreciated by the skilled person, the term back-to-back may generally refer to the configuration of two switches with bulk diodes in the opposite directions. Specifically, it is to be noted that the use of devices with fixed body connection would generally allow the use of switching devices with lower $R_{SP}$ for the same voltage rating. Accordingly, for the same target impedance of the power switching devices, the topologies as proposed in the present disclosure would generally occupy smaller area while at the same time achieving higher output voltages $V_{OUT}$ for a given load resistance. Additionally or alternatively, lower $V_{IN}$ voltages could be achieved for the same $V_{OUT}$ voltages and load resistance $R_{OUT}$.

In some embodiments, in the proposed power converter the inductive element may be coupled (e.g., connected or directly coupled) to the capacitive element through the fifth switching element. In other words, one end/port/terminal of the inductive element may be coupled (e.g., directed connected) through the fifth switching device to one end/port/terminal of the capacitive element.

In some embodiments, another port (or terminal) of the second switching element (e.g., a source port of a MOSFET) may be coupled to the reference node (e.g., GND or any other suitable node).

In some embodiments, the power converter proposed in the present disclosure may be operated in a number of different operation modes, one of which may be a buck (or in some possible cases also referred to as step-down) operation mode.

In some embodiments, during a magnetizing phase of the buck operation mode (when (the coil of) the inductive element is magnetized), the first, fourth and fifth switching elements may be put in an ON state (e.g., a conductive state), while the second and third switching elements may be put in an OFF state (e.g., a non-conductive state). In particular, the flying capacitive element may be (re-)charged during the magnetizing phase of the buck operation mode.

In some embodiments, during a demagnetizing phase of the buck operation mode (when (the coil of) inductive element is demagnetized), the first, second and fourth switching elements may be in the ON state, while the third and fifth switching elements may be in the OFF state. Further, the flying capacitive element is (re-)charged during the demagnetizing phase of the buck operation mode.

In some embodiments, during the demagnetizing phase of the buck operation mode, a voltage across the third switching element (e.g., the maximum drain-source voltage, or sometimes also denoted as $V_{DS\_max}$, or even $V_{DS}$ for simplicity) may equal the output voltage. Thereby, the third switching element may be implemented by using a switching device having a lower voltage rating (e.g., lower than that used in some possible implementations of the buck-boost converter, e.g., the one as shown in FIG. 2, which is typically $V_{IN}+V_{OUT}$).

In some embodiments, the power converter proposed in the present disclosure may be further operated in a boost (or in some cases also referred to as step-up) operation mode.

In some embodiments, during a magnetizing phase of the boost operation mode (when (the coil of) the inductive element is magnetized), the third and fifth switching elements may be in the ON state, while the first, second and fourth switching elements may be in the OFF state.

In some embodiments, during a demagnetizing phase of the boost operation mode (when (the coil of) inductive element is demagnetized), the first, fourth and fifth switching elements may be in the ON state, while the second and third switching elements may be in the OFF state.

In some embodiments, another port (or terminal) of the second switching element (e.g., a source port of a MOSFET) may be, as an alternative to being coupled to the reference node (e.g., GND), coupled to the third intermediate node. That is, the flying capacitive element, the second switching element and the inductive element may be coupled (e.g., connected) in series between the first intermediate node and the output node.

In some embodiments, particularly in the alternative topology as described above, the power converter may be operated in a plurality of modes as well, with one of which being the buck (step-down) operation mode.

In some embodiments, during a demagnetizing phase of the buck operation mode (when (the coil of) inductive element is demagnetized), the first, second and fourth switching elements may be in the ON state, while the third and fifth switching elements may be in the OFF state. In particular, the flying capacitive element may be (re-)charged during the demagnetizing phase of the buck operation mode.

In some embodiments, particularly in the alternative topology as described above, (the coil of) the inductive element may be demagnetized through the second and fourth switching elements that are serially coupled (connected).

In some embodiments, during the demagnetizing phase of the buck operation mode (when (the coil of) inductive element is demagnetized), a voltage across the third switching element (e.g., the maximum drain-source voltage, or sometimes also denoted as $V_{DS\_max}$, or even $V_{DS}$ for simplicity) may equal the output voltage. Thereby, the third switching element may be implemented by using a switching device having a lower voltage rating (e.g., lower than that used in some possible implementations of the buck-boost converter, e.g., the one as shown in FIG. 2, which is typically $V_{IN}+V_{OUT}$).

In some embodiments, particularly in the alternative topology as described above, during a magnetizing phase (when (the coil of) the inductive element is magnetized) of a boost (step-up) operation mode of the power converter, a voltage across the second switching element (e.g., the maximum drain-source voltage, or sometimes also denoted as $V_{DS\_max}$, or even $V_{DS}$ for simplicity) may equal the input voltage. Thereby, the second switching element may also be implemented by using a switching device having a lower voltage rating (e.g., lower than that used in some possible implementations of the buck-boost converter, e.g., the one as shown in FIG. 2, which is typically $V_{IN}+V_{OUT}$).

According to another aspect of the present disclosure, it is provided a method for operating a power converter (e.g., a buck-boost power converter) being configured for generating (e.g., converting) an output voltage at an output node of the power converter based on an input voltage received at an input node of the power converter.

In particular, the method may comprise providing and coupling (e.g., connecting or directly coupling) a first switching element (or switching device) between the input node and a first intermediate node. The method may further comprise providing and coupling (e.g., connecting or directly coupling) an inductive element (e.g., an inductor) between a second intermediate node and the output node. The method may yet further comprise providing a second switching element and coupling (e.g., connecting or directly coupling) one port (or terminal) of the second switching element (e.g., a drain port of a MOSFET) to the second intermediate node. The method may also comprise providing a third switching element and a fourth switching element, and coupling (e.g., connecting or directly coupling) the third and fourth switching elements in series between the output node and a reference node. The reference node may be ground (GND), or any other suitable reference node, as will be understood and appreciated by the skilled person. In addition, the method may also comprise providing and coupling (e.g., connecting or directly coupling) a flying capacitive element (e.g., a flying capacitor) between the first intermediate node and a third intermediate node that is arranged between the third and fourth switching elements. Finally, the method may comprise providing and coupling (e.g., connecting or directly coupling) a fifth switching element between the first and second intermediate nodes. Notably, any switching elements/devices mentioned in this disclosure may be transistor devices, such as FETs, MOSFETs, etc., or any other suitable switching devices, as will be understood and appreciated by the skilled person.

Configured as proposed above, the buck-boost converters of the present disclosure may generally achieve the same functionality of the conventional power converters, while allowing devices with lower voltage rating (e.g., a lower maximum drain-source voltage) to be used. Moreover, the power switching devices in the present disclosure would generally not require bulk-switching scheme (body switching) or back-to-back devices. Specifically, it is to be noted that the use of devices with fixed body connection would generally allow the use of switching devices with lower $R_{SP}$ for the same voltage rating. Accordingly, for the same target impedance of the power switching devices, the topologies as proposed in the present disclosure would generally occupy smaller area while at the same time achieving higher output voltages $V_{OUT}$ for a given load resistance. Additionally or alternatively, lower $V_{IN}$ voltages could be achieved for the same $V_{OUT}$ voltages and load resistance $R_{OUT}$.

In some embodiments, the method may further comprise coupling another port/terminal of the second switching element (e.g., a source port of a MOSFET) to the reference node (e.g., GND or any other suitable node).

In some embodiments, the method may further comprise, during a magnetizing phase (when (the coil of) the inductive element is magnetized) of a buck operation mode of the power converter, switching the first, fourth and fifth switching elements to an ON state (e.g., a conductive state), and switching the second and third switching elements to state (e.g., a non-conductive state), thereby (re-)charging the flying capacitive element.

In some embodiments, the method may further comprise, during a demagnetizing phase (when (the coil of) inductive element is demagnetized) of a buck operation mode of the power converter, switching the first, second and fourth switching elements to the ON state, and switching the third and fifth switching elements to the OFF state, for (re-)charging the flying capacitive element.

In some embodiments, the method may further comprise, during a magnetizing phase (when (the coil of) the inductive element is magnetized) of a boost operation mode of the power converter, switching the third and fifth switching elements to the ON state, and switching the first, second and fourth switching elements to the OFF state.

In some embodiments, the method may further comprise, during a demagnetizing phase (when (the coil of) inductive element is demagnetized) of a boost operation mode of the power converter, switching the first, fourth and fifth switching elements to the ON state, and switching the second and third switching elements to the OFF state.

In some embodiments, the method may further comprise, in alternative to coupling another port (terminal) of the second switching element to the reference node (e.g., GND), coupling said another port of the second switching element to the third intermediate node instead. As such, it may also be seen that the flying capacitive element, the second switching element and the inductive element may be coupled (e.g., connected) in series between the first intermediate node and the output node.

In some embodiments, particularly in the alternative buck-boost topology as described above, the method may further comprise, during a demagnetizing phase (when (the coil of) inductive element is demagnetized) of a buck operation mode of the power converter, switching the first, second and fourth switching elements to the ON state, and switching the third and fifth switching elements to the OFF state, thereby (re-)charging the flying capacitive element.

In some embodiments, particularly in the alternative buck-boost topology as described above, the method may further comprise, demagnetizing (the coil of) the inductive element through the second and fourth switching elements that are serially coupled.

The details of the disclosed method can be implemented as an apparatus (e.g., a power converter) adapted to execute some or all or the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods.

It is also understood that in the present document, the term "couple" or "coupled" refers to elements being in electrical communication with each other, whether directly connected e.g., via wires, or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a conventional buck-boost power converter topology, FIG. 2 schematically illustrates an example of an improved hybrid buck-boost power converter topology, FIGS. 3A-3C schematically illustrate examples of switching phases of the hybrid buck-boost power converter of FIG. 2, FIG. 4 schematically illustrates an example of simulation results of the hybrid buck-boost power converter of FIG. 2, FIG. 5 schematically illustrates an example of a hybrid buck-boost power converter according to embodiments of the present disclosure, FIGS. 6A-6C schematically illustrate examples of switching phases of the hybrid buck-boost power converter of FIG. 5, FIG. 7 schematically illustrates an example of another hybrid buck-boost power converter according to embodiments of the present disclosure, FIG. 8 schematically illustrates an example of a demagnetizing phase of the hybrid buck-boost power converter of FIG. 7, FIG. 9 schematically illustrates an example of simulation results of the hybrid buck-boost power converter of FIG. 7 in comparison with those of the hybrid buck-boost power converters of FIGS. 2 and 5.

DESCRIPTION

As indicated above, identical or like reference numbers in the present disclosure may, unless indicated otherwise, indicate identical or like elements, such that repeated description thereof may be omitted for reasons of conciseness. Also, any switching elements/devices mentioned in this disclosure may be transistor devices, such as MOSFETs, or any other suitable switching devices. In some of the figures the switching devices may be simplified, but they should be understood as the same or similar switching devices as shown in other figures.

Figure 1:
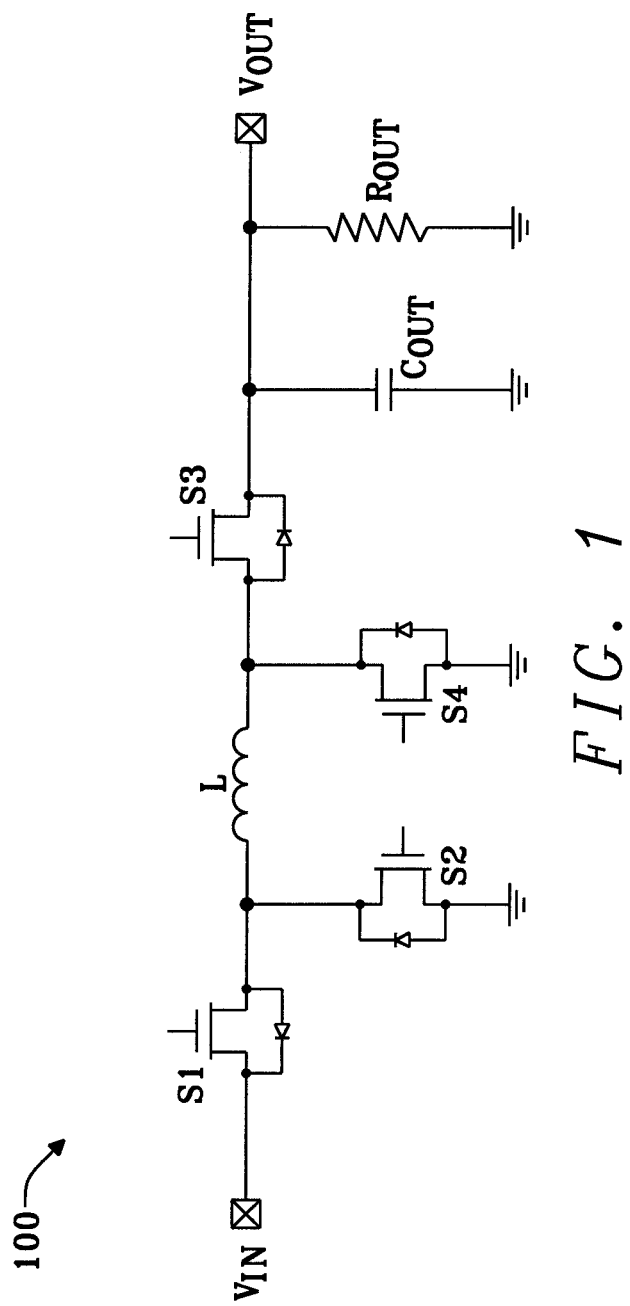

As indicated above, FIG. 1 schematically illustrates an example of a conventional buck-boost (BuBo) power converter topology 100. In particular, as can be understood and appreciated by the skilled person, switches S1, S2 and S3 are generally involved in the buck (step-down) operation of the power converter 100; while on the other hand, switches S1, S3 and S4 are generally involved in the boost (step-up) operation of the power converter.

As such, it may be understood that a major drawback for the power efficiency of such a BuBo topology as shown in FIG. 1 lies generally in the presence of two switches, i.e., switches S1 and S3, in the main current path from $V_{IN}$ to $V_{OUT}$ through the inductor L. This may also be seen as a fundamental reason for which the conventional BuBo converter 100 might typically be considered to be less efficient of a buck-only or boost-only topology.

Figure 2:
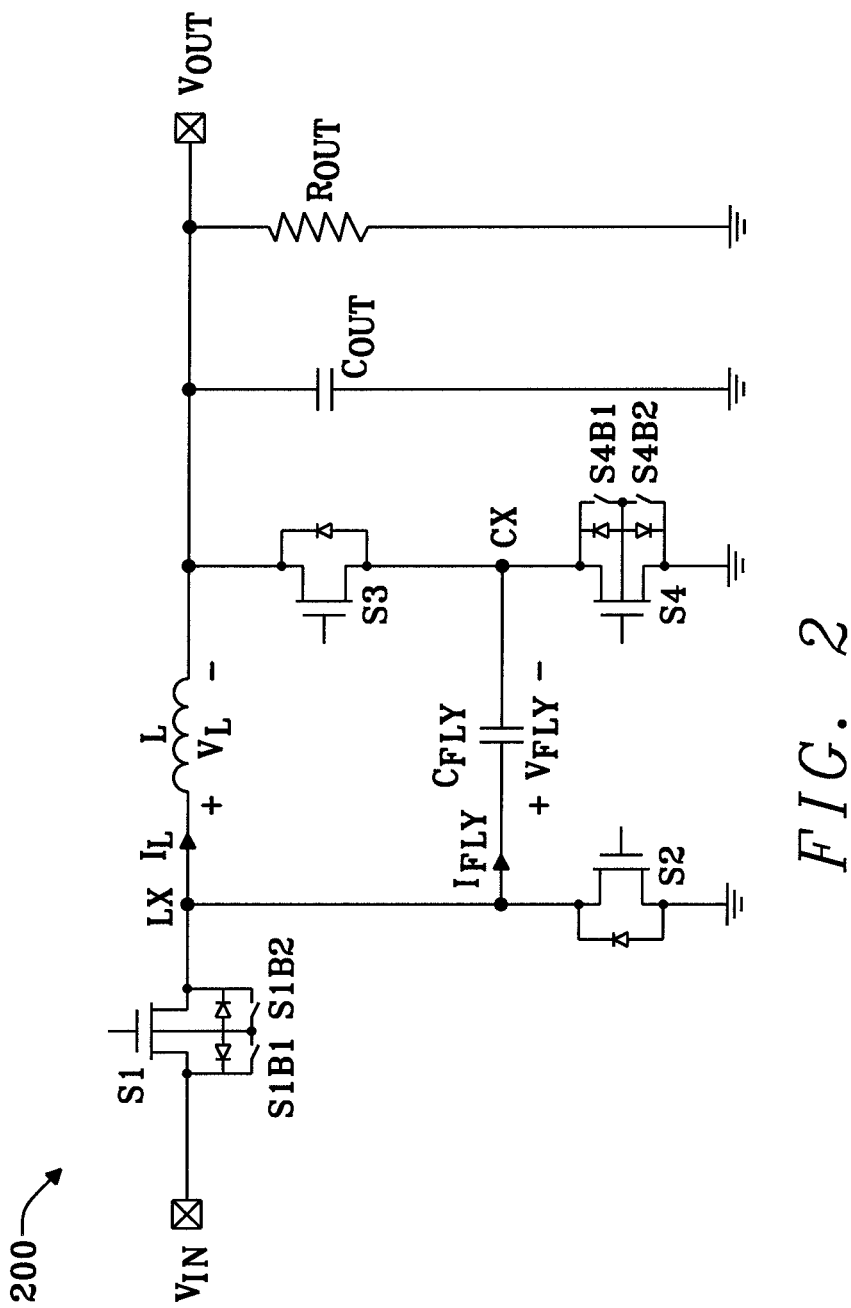

FIG. 2 schematically illustrates an example of a hybrid buck-boost power converter topology 200 with improved efficiency compared to that of FIG. 1. The main reason for such improvement is generally the use of only one switch, i.e., S1, in the main current path during its operation phases.

Figure 3A:
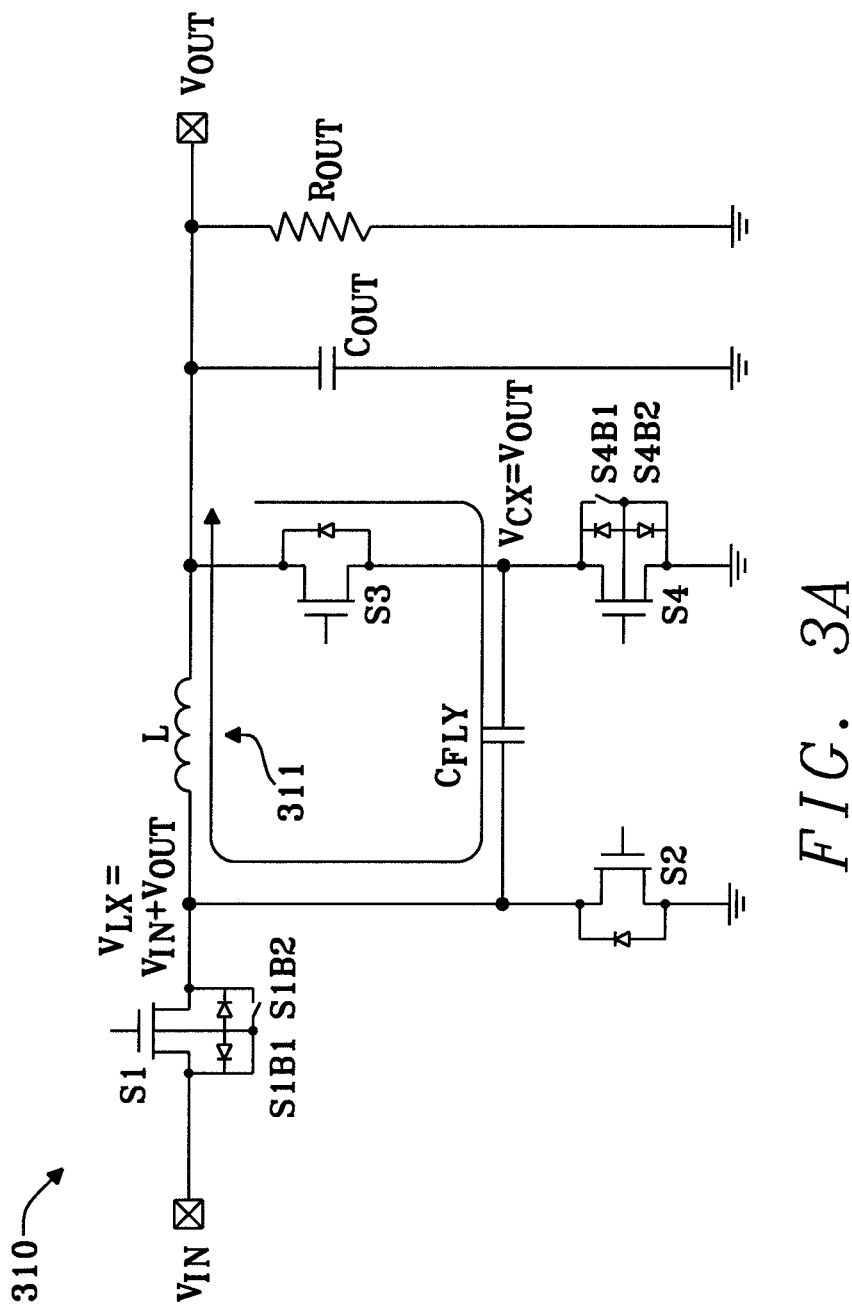
Figure 3B:
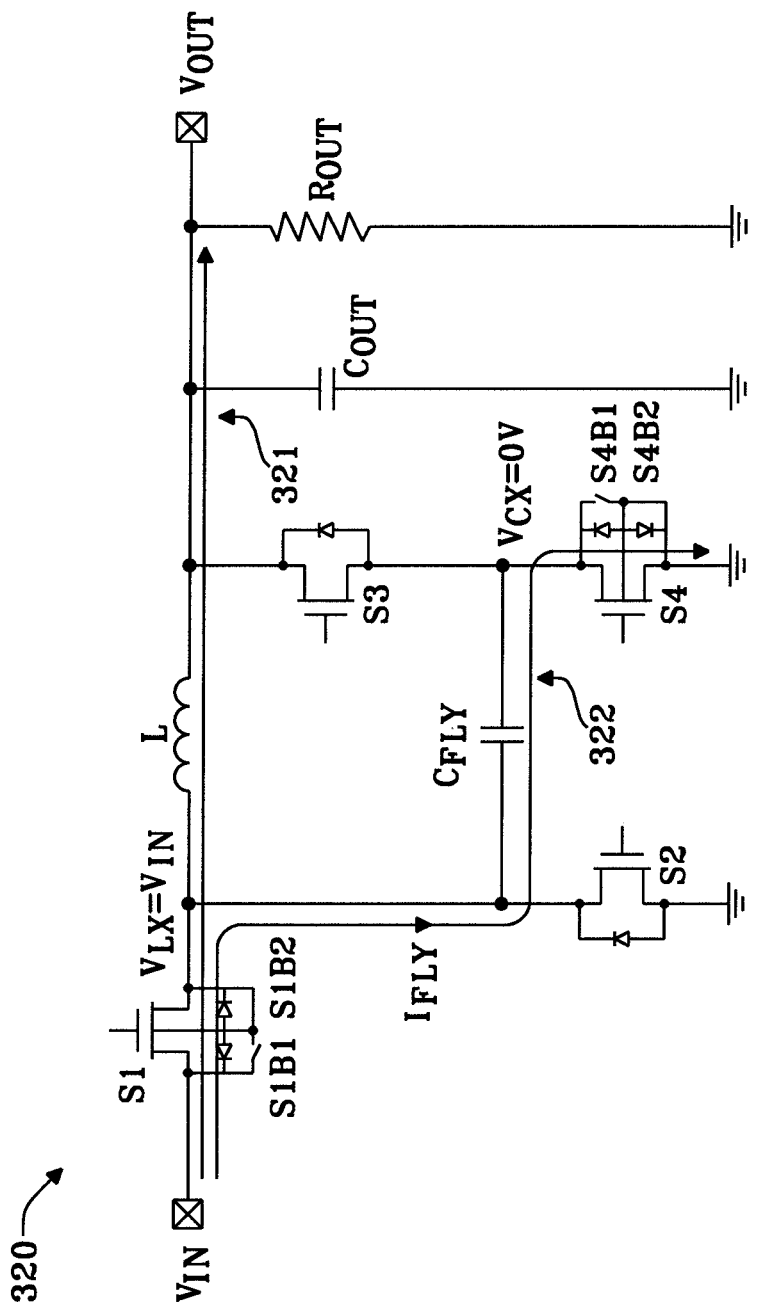
Figure 3C:
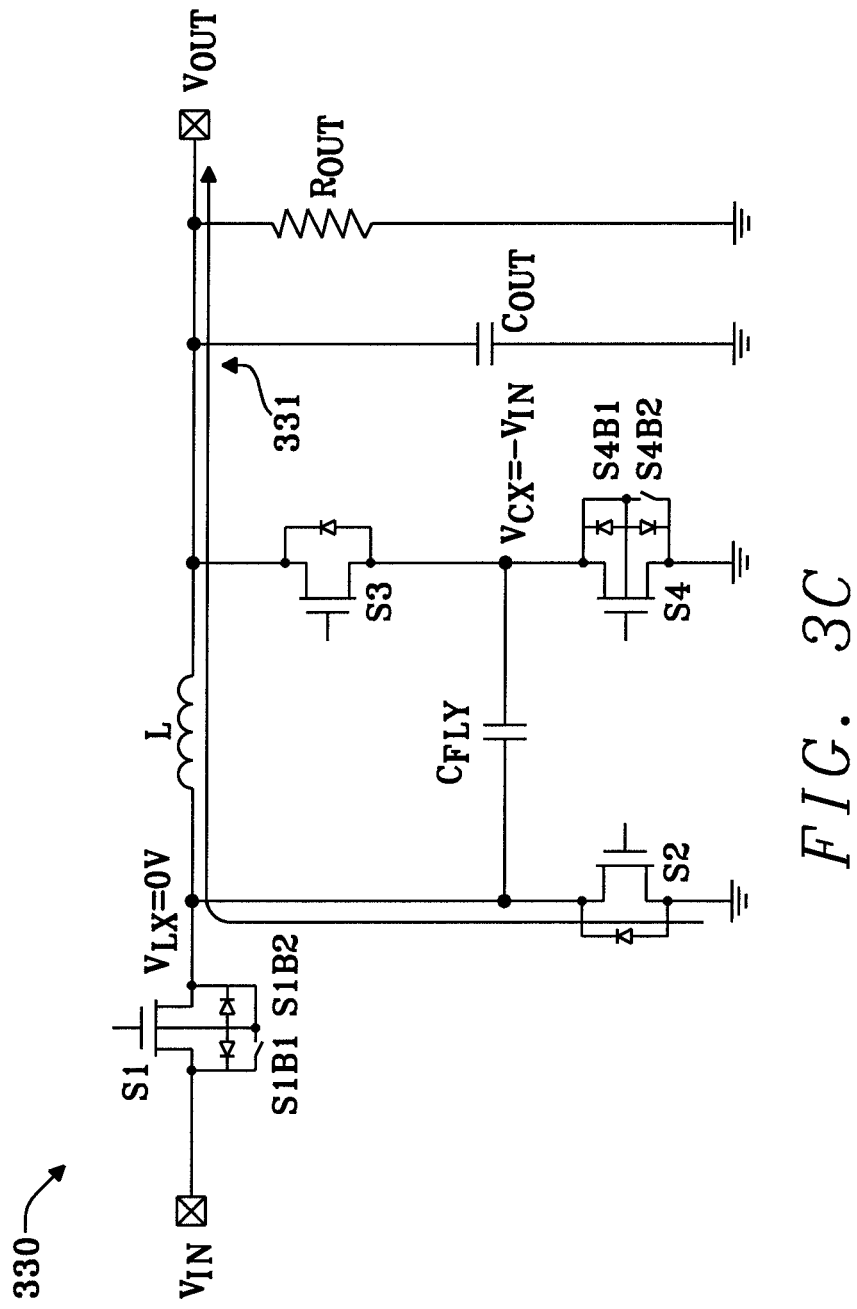

Now, reference is also made to FIGS. 3A-3C, wherein the exemplary switching phases of the power converter 200 of FIG. 2 are schematically illustrated.

In particular, as will be understood and appreciated by the skilled person, the buck operation may generally cycle through the phases as shown in FIGS. 3B and 3C. Broadly speaking, it may be simply seen as equivalent or similar to that in a conventional buck operational phase involving switches S1 and S2.

The relationship between $V_{IN}$ and $V_{OUT}$ may be expressed by:

$$\frac{V_{OUT}}{V_{IN}} = D \text{ with } D \in [0, 1] \tag{1}$$

On the other hand, the boost operation may generally cycle through the phases of FIGS. 3A and 3B. Particularly, similar to that in a conventional buck operational phase, the boost operation of the hybrid power converter 200 may also involve switches S1, S3 and S4.

The relationship between $V_{IN}$ and $V_{OUT}$ may then become:

$$\frac{V_{OUT}}{V_{IN}} = \frac{1}{1-D} \text{ with } D \in [0, 1] \tag{2}$$

Additionally, it may also be understood that the (complete) buck-boost operation may cycle through all phases of FIGS. 3A, 3B and 3C, wherein all switches S1, S2, S3 and S4 may be involved.

It should nevertheless be noted that, in order to guarantee the correct operations of the power converter 200, at least the switches S1 and S4 would require to be implemented as bulk switches (or back-to-back switches, not shown in the figures). As will be understood and appreciated by the skilled person, depending on the implementation of the switching devices, e.g., in the examples of MOSFET, the back-to-back configuration may refer to the configuration of two devices that are in series and either they have their drain terminals connected or their source terminals connected. The consequence (and most important property) of such back-to-back configuration is that their bulk diodes point in opposite directions. Notably, an illustrative example of a bulk-switching scheme (body switching) is also schematically shown in the power converter 200 of FIGS. 2 and 3A-3C, wherein switch S1 is implemented as switches S1B1 and S1B2 and switch S4 is implemented as switches S4B1 and S4B2.

To be more specific, during the buck demagnetizing phase (as indicated by arrow 331 in FIG. 3C), the voltage of node CX (right to the flying capacitor $C_{FLY}$) would generally go below GND to $-V_{IN}$, and therefore the switch S4B1 would have to be closed. Further, during the boost magnetizing phase (as indicated by arrow 311 in FIG. 3A), the voltage of node LX (left to the inductor L) would generally go above $V_{IN}$ to $V_{IN}+V_{OUT}$, and therefore the switch S1B1 would have to be closed in that case.

Accordingly, the voltage rating (which, in the examples of MOSFET, may be measured based on the maximum $V_{DS}$ voltage $V_{DS\_max}$) for each switching device is exemplarily summarized in the below Table 1 together with corresponding phase during which $V_{DS\_max}$ is applied across the respective devices. Notably, as can be understood and appreciated by the skilled person, the voltage ratings summarized below may be deduced from the corresponding voltages at respective nodes (or ports) of the switching devices during the respective operation phases, some of which (e.g., voltages $V_{LX}$, and $V_{CX}$ at nodes LX and CX) are exemplarily shown in FIGS. 3A-3C.

TABLE 1

Voltage rating of the switching devices of the converter 200 in FIGS. 2 and 3.

| Switch | Phase w/ $V_{DS\_max}$ | $V_{DS\_max}$ |
|---|---|---|
| S1 | Boost mag | $V_{OUT}$ |
| S2 | Boost mag | $V_{IN} + V_{OUT}$ |
| S3 | BuBo demag | $V_{IN} + V_{OUT}$ |
| S4 | Boost mag | $V_{OUT}$ |

As can be seen from the voltage ratings summarized in the above Table 1, both switches S2 and S3 would exhibit $V_{DS\_max}$ that equals $V_{IN}+V_{OUT}$, which may, in some possible implementation scenarios, be considered too high.

As noted above, a higher voltage rating would generally translate into a higher $R_{SP}$ for the device and, in turn, into a larger silicon area for a given target $R_{ON}$ of a switching device (e.g., a FET).

Notably, in the converter 200 of FIGS. 2 and 3A-3C the use of the flying capacitor $C_{FLY}$ for magnetizing the inductor L would generally introduce a limitation on the maximum achievable $V_{OUT}$ during its boost operation. The limitation is generally a consequence of the charge conservation on $C_{FLY}$. To be more specific, the charge removed from the capacitor $C_{FLY}$ during the boost magnetizing phase (as shown in FIG. 3A) is added during the boost demagnetizing phase (as shown in FIG. 3B). Therefore, the current $I_{FLY}$ flowing in $C_{FLY}$ during the demagnetizing phase could be expressed as (by applying charge conservation principle on $C_{FLY}$):

$$\frac{I_{FLY}}{I_L} = \frac{D}{1-D} \text{ with } D \in [0, 1] \tag{3}$$

Broadly speaking, equation (3) would generally indicate that, in order to keep $I_{FLY}<I_L$, the duty cycle D of the switches should then be limited to 0.5. On the other hand, for value of D>0.5, $I_{FLY}$ would generally experience a steep increase.

Figure 4:
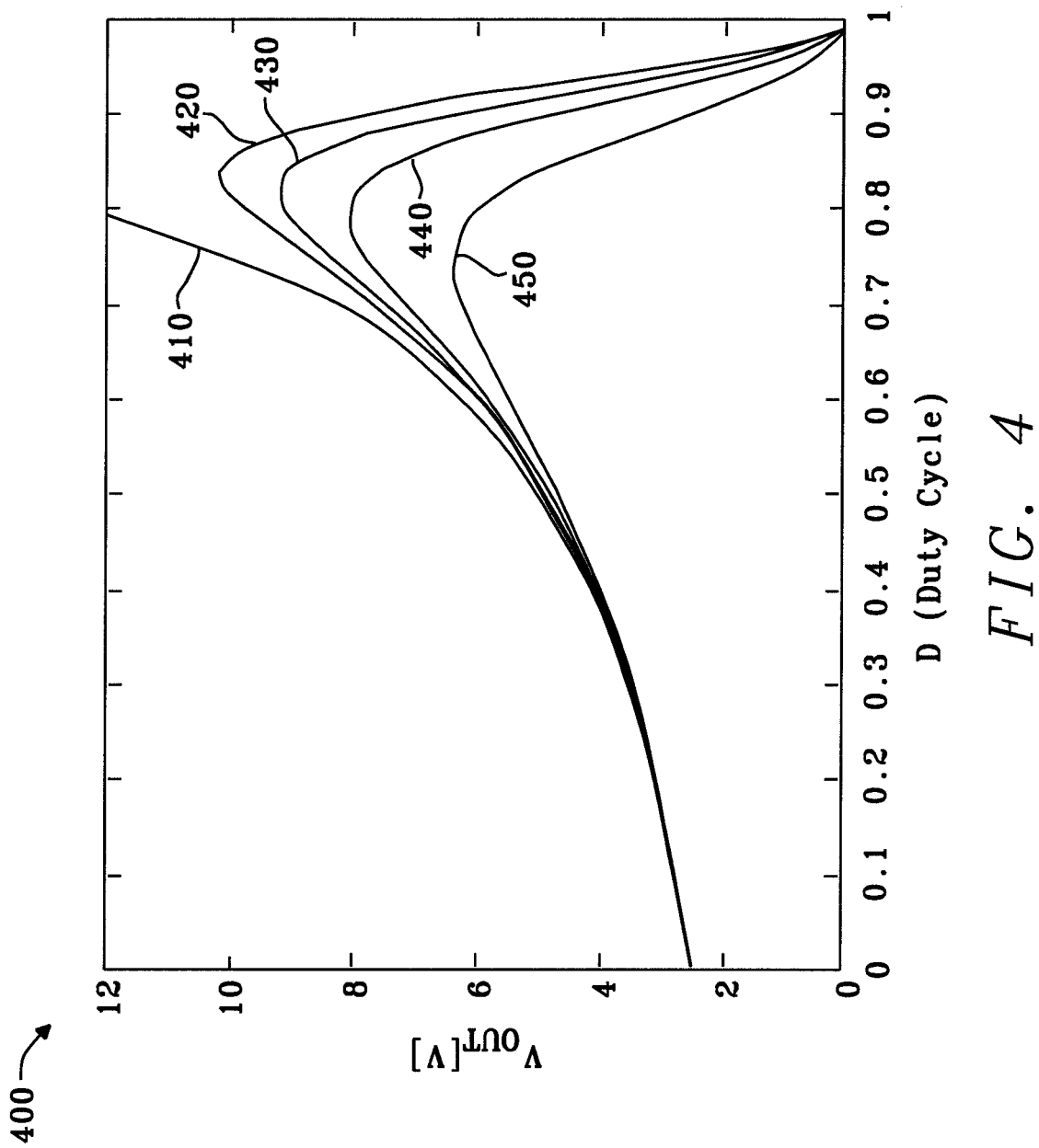

FIG. 4 schematically illustrates an example of simulation results of the hybrid buck-boost power converter 200 of FIG. 2.

Particularly, FIG. 4 shows the maximum theoretical $V_{OUT}$ achievable (that is, in the presently shown examples, assuming no non-overlap time between the two boost phases, $R_{ON}$ of 20 mΩ for all switches, equivalent series resistance (ESR) of 5 mΩ, and DC resistance (DCR) of 20 mΩ) for different values of output load resistance $R_{OUT}$ of the converter 200 of FIG. 2 at $V_{IN}$=2.5 V. More specifically, in the examples of FIG. 4, diagram 410 generally refers to the ideal scenario, whereas diagrams 420, 430, 440 and 450 refer to simulation results based on $R_{OUT}$ set to be 20Ω, 15Ω, 10Ω and 5Ω, respectively.

Because of the increase in $I_{FLY}$ for increasing duty cycle values, the voltage across the $C_{FLY}$ would generally be progressively reduced by the IR drop on the $R_{ON}$ of switches S1 and S4 and on the ESR of $C_{FLY}$. This would generally contribute to lower the maximum $V_{OUT}$ achievable by the boost for a given $R_{OUT}$.

Figure 5:
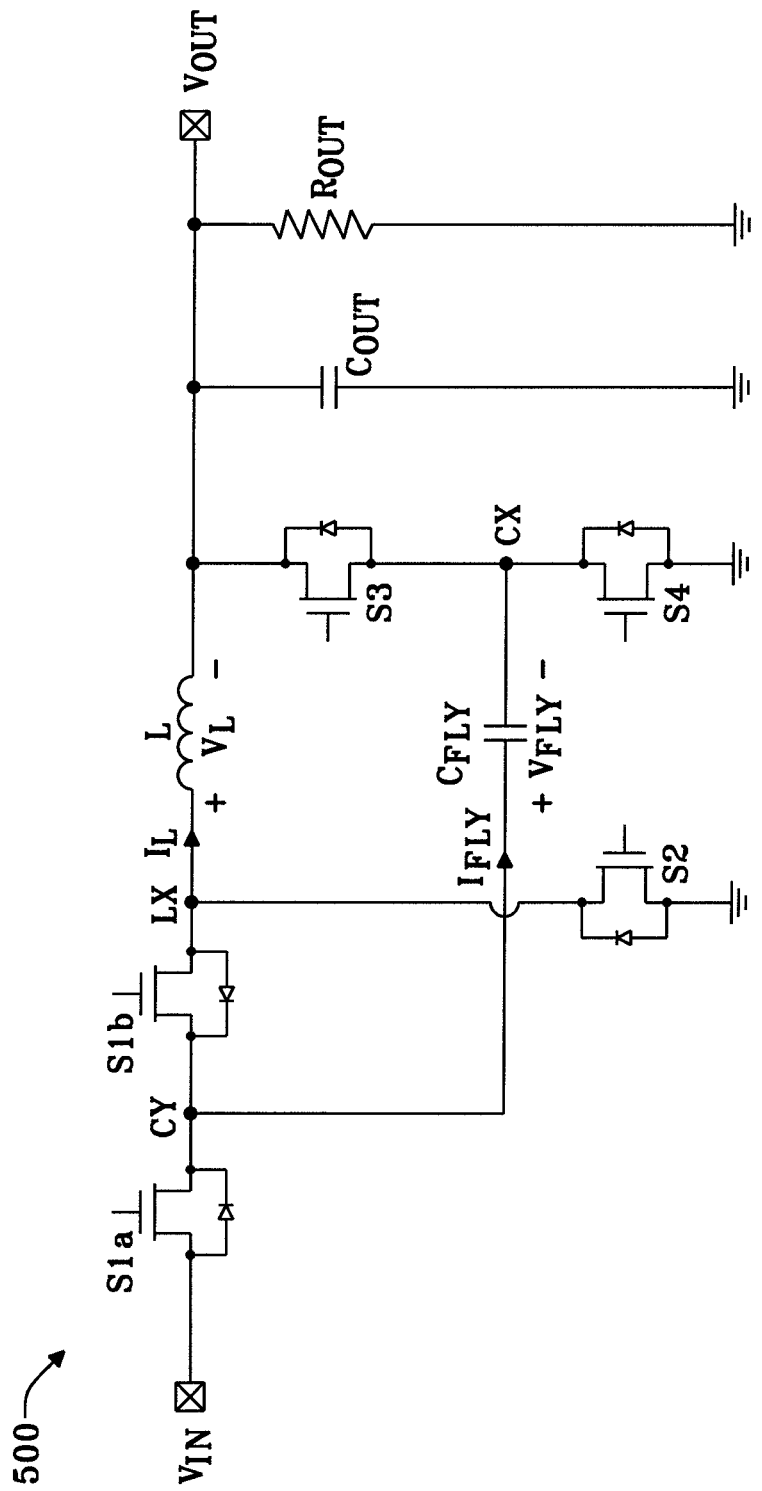

Now reference is made to FIG. 5, which schematically illustrates an example of a hybrid buck-boost power converter 500 according to embodiments of the present disclosure.

In particular, compared to the power converter 200 of FIG. 2, the hybrid buck-boost power converter 500 as shown in FIG. 5 may be seen as to generally introduce a further switching device S1b (i.e., the claimed fifth switching device) that is coupled (e.g., connected or directly coupled) between the LX node of the inductor L and the CY node of the flying capacitor $C_{FLY}$. Put differently, it may also be seen as the flying capacitor $C_{FLY}$ being coupled between one intermediate node that is arranged between the switches S1a and S1b, and another intermediate node that is arranged between the switches S3 and S4. As can be seen from the example as shown in FIG. 5, switches S1a and S1b are connected in a back-to-back configuration, i.e., their body diodes pointing in opposite directions, as explained earlier.

Figure 6A:
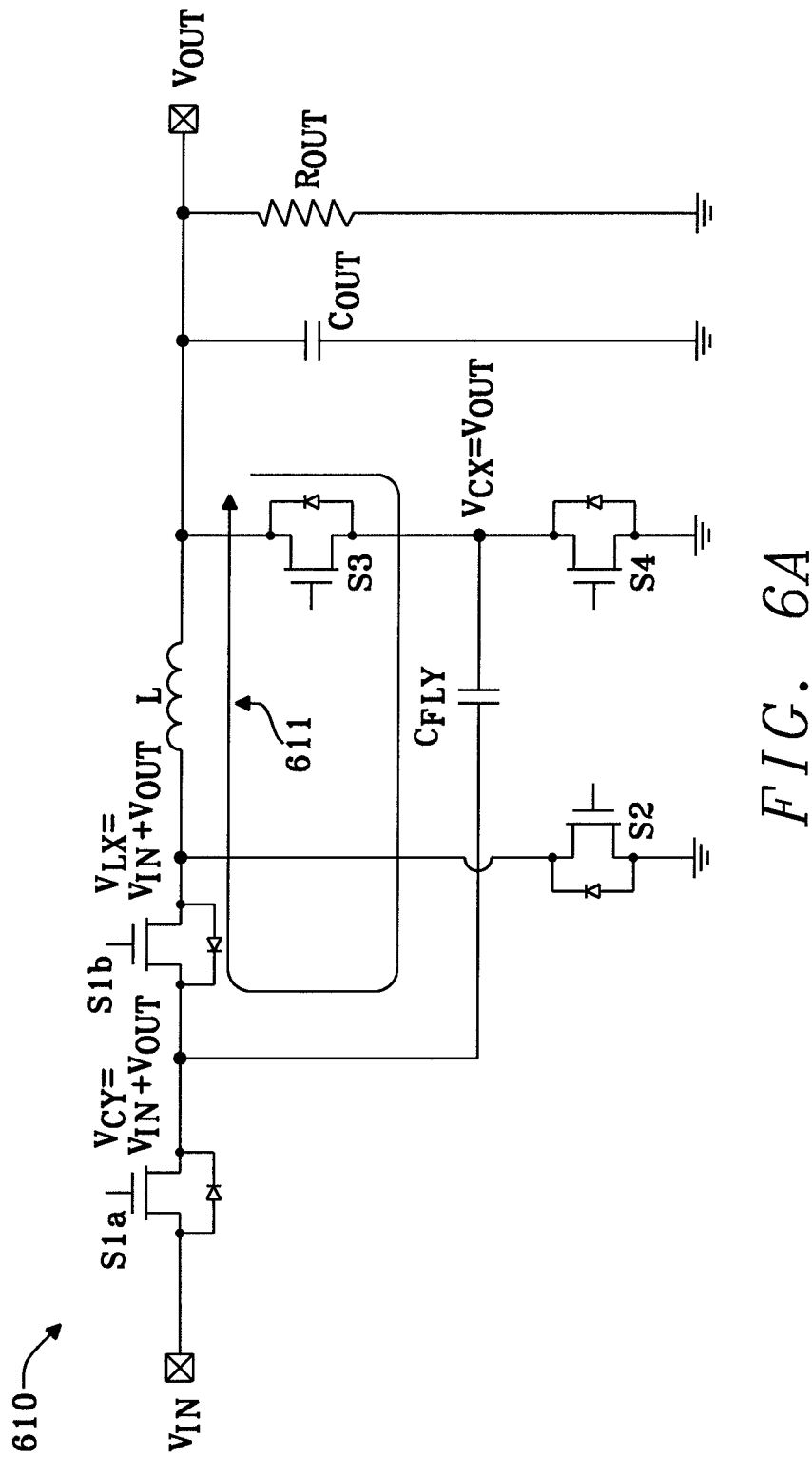
Figure 6B:
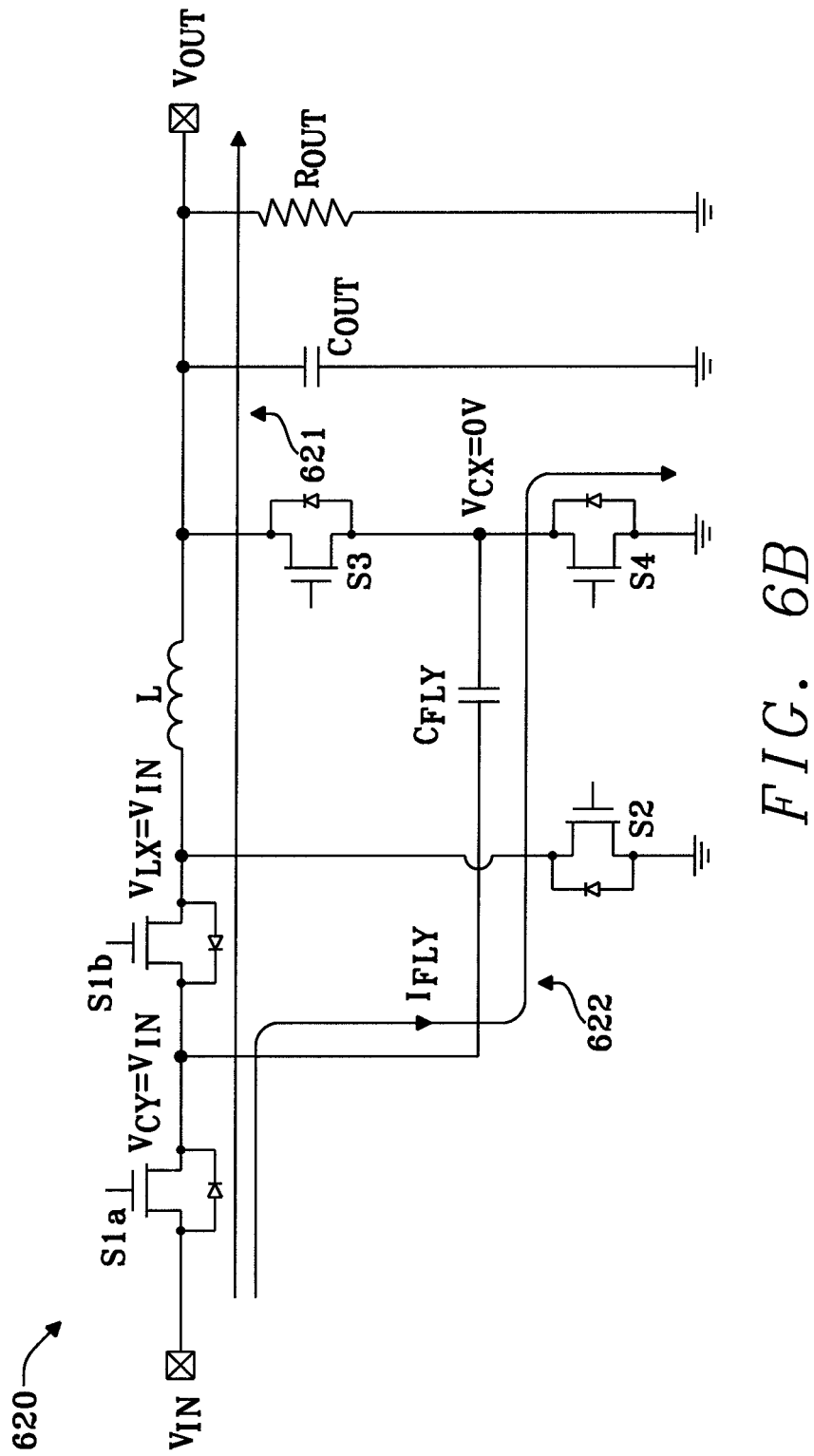
Figure 6C:
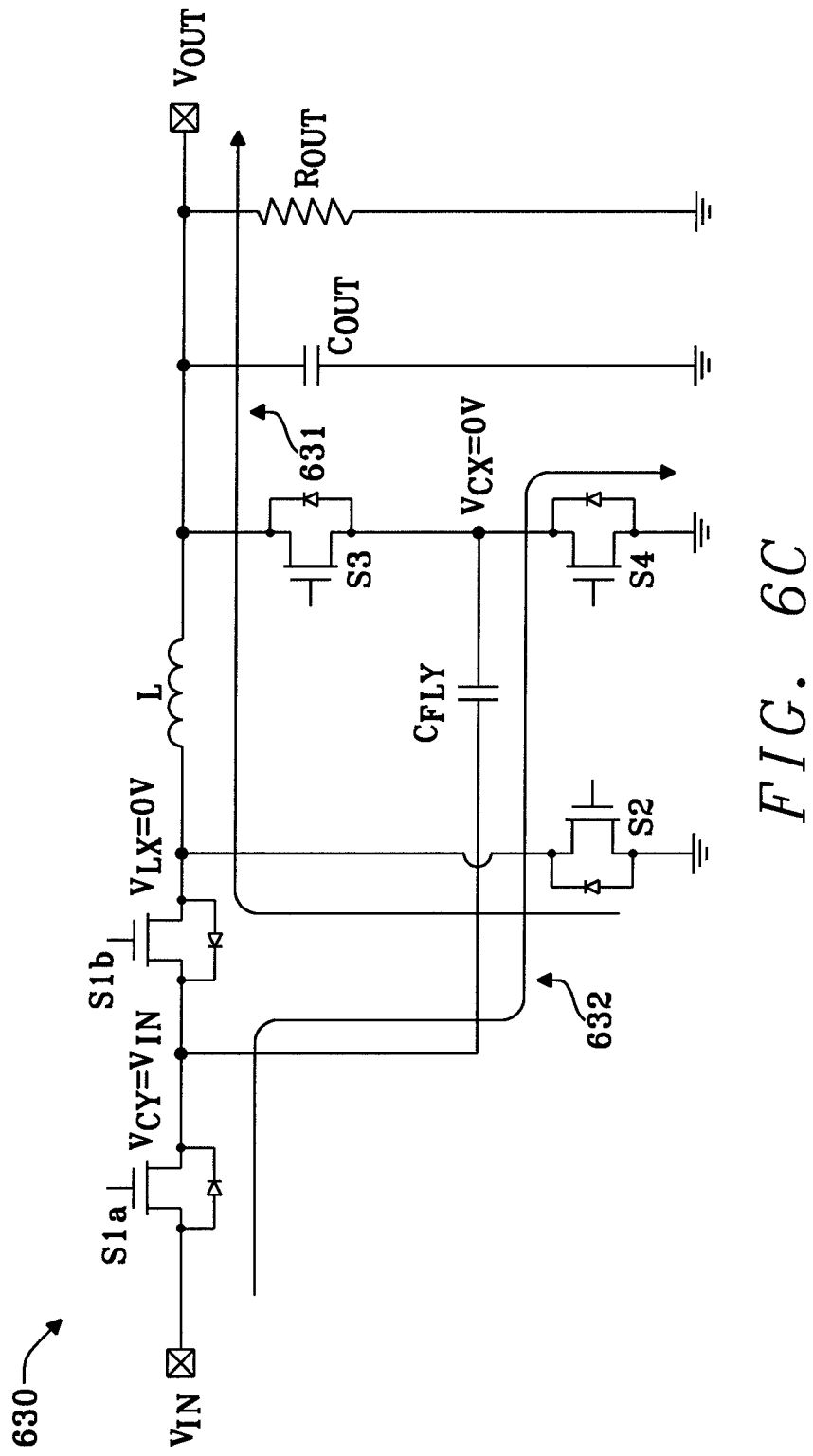

Now, with reference to FIGS. 6A-6C, the exemplary switching phases of the power converter 500 of FIG. 5 will be schematically illustrated.

Broadly speaking, the operation of this power converter topology 500 is generally the same as or similar to that of the converter 200 as shown in FIG. 2. However, it is to be noted that the power converter 500 would generally not rely on body switching or back-to-back devices, and thus could use lower voltage rated devices, as will be illustrated in more detail below.

In particular, the buck operation may generally cycle through the phases of FIGS. 6B and 6C, which may be seen as equivalent or similar to that of a conventional buck operation involving switches S1b and S2. To be more specific, during the magnetizing phase (indicated by arrow 621) of the buck operation mode as shown in FIG. 6B, switches S1a, S1b and S4 are set in the ON state (e.g., the conductive state), while switches S2 and S3 are set in the OFF state (e.g., the non-conductive state). Moreover, during the demagnetizing phase (indicated by arrow 631) of the buck operation mode as shown in FIG. 6C, switches S1a, S2 and S4 are set in the ON state (e.g., the conductive state), while switches S3 and S1b are set in the OFF state (e.g., the non-conductive state). Notably, as illustrated above, switches S1a and S4 are closed in both the magnetizing and demagnetizing phases as shown in FIGS. 6B and 6C, so that $C_{FLY}$ is connected between $V_{IN}$ and GND, thereby being charged or re-charged in both phases (indicated by arrows 622 and 632, respectively).

On the other hand, the boost operation may generally cycle through the phases of FIGS. 6A and 6B. Particularly, the boost magnetizing phase may generally involve switches S1b and S3 (indicated by arrow 611), whilst the boost demagnetizing phase may generally involve switches S1a and S1b instead (indicated by arrow 621). To be more specific, during the magnetizing phase of the boost operation mode, switches S1b and S3 are switched to the ON state, while switches S1a, S2 and S4 are switched in the OFF state. Correspondingly, during the demagnetizing phase of the boost operation mode, switches S1a, S1b and S4 are switched to the ON state, while switches S2 and S3 switching elements are switched to the OFF state. It is to be noted that the flying capacitor $C_{FLY}$ is also (re-)charged via S1a and S4 switches (indicated by arrow 622) during the boost demagnetizing phase.

Finally, the (complete) buck-boost operation may generally cycle through all phases of FIGS. 6A, 6B and 6C and involves all switches, as can be understood and appreciated by the skilled person. Thus, repeated description thereof may be omitted for the sake of conciseness.

Figure 7:
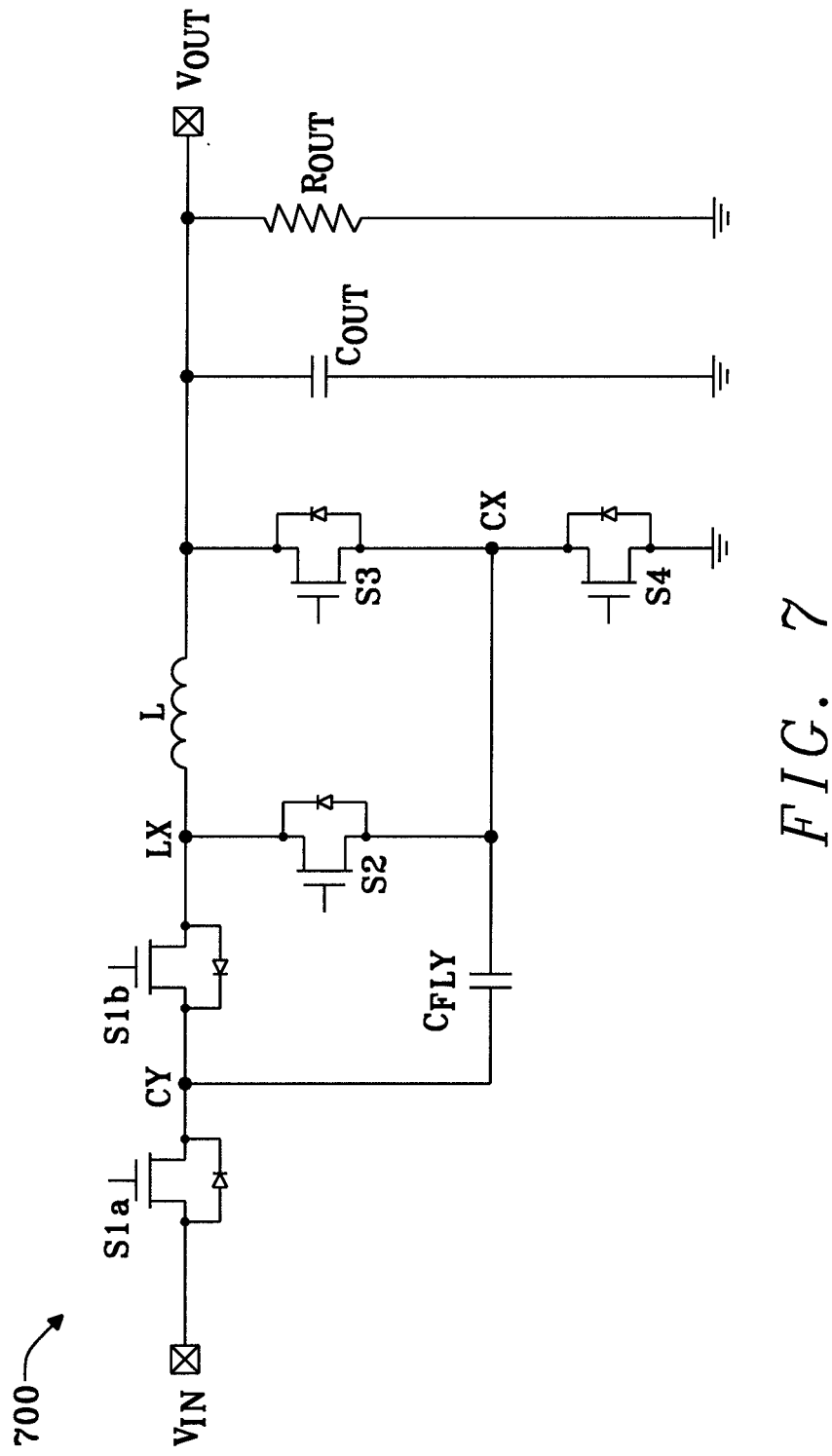

Furthermore, FIG. 7 schematically illustrates an example of another hybrid buck-boost power converter 700 according to embodiments of the present disclosure, which may also be seen as a (further improved) variant of the buck-boost power converter 500 as shown in FIGS. 5 and 6A-6C. Notably, as will become apparent in the detailed description below, broadly speaking, this variant would generally allow the use of low voltage rated devices for all switches.

In particular, as can be seen from FIG. 7, the topology of the hybrid buck-boost power converter 700 is generally the same as that of the hybrid buck-boost power converter 500 is FIG. 5, except for that, instead of coupling switch S2 between node LX and GND (or any other suitable node with a reference potential), the switch S2 is now coupled (e.g., connected) between node LX of the inductor and node CX of the flying capacitor $C_{FLY}$.

Figure 8:
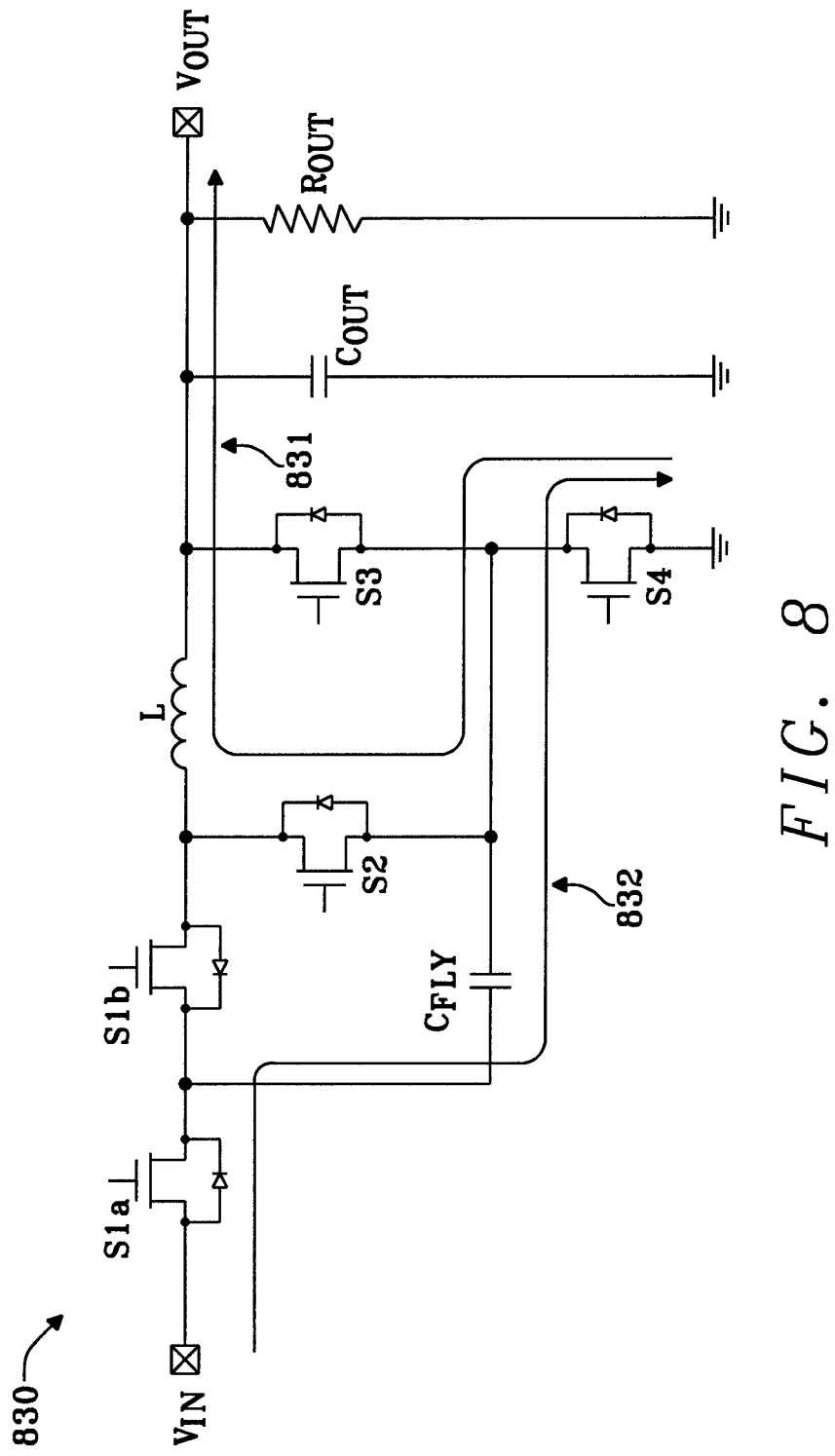

This proposed hybrid variant topology 700 generally operates the same as the topology 500 as shown in FIGS. 6A to 6C, with the exception of the buck demagnetizing phase (as exemplarily shown in FIG. 8) involving both switches S2 and S4 (as indicated by arrow 831). Put differently, during the buck demagnetizing phase, the inductor L and the switches S2 and S4 may be seen as being coupled in series between the output node and the reference node (i.e., GND in the present example), thereby demagnetizing the inductor L. To be more specific, during the demagnetizing phase of the buck operation mode, switches S1a, S2 and S4 are switched to the ON state, while switches S1b and S3 are switched to the OFF state. Similar as shown in FIG. 6C, the flying capacitor $C_{FLY}$ is also (re-)charged during the demagnetizing phase of the buck operation mode (as indicated by arrow 832).

Similar to Table 1, the respectively voltage ratings for the switching devices of both hybrid converter topologies 500 and 700 are summarized and shown in below Table 2. Similar as Table 1, the voltage ratings summarized below in Table 2 may also be readily deduced from the corresponding voltages at respective nodes (or ports) of the switching devices during the respective operation phases, some of which (e.g., voltages $V_{LX}$, $V_{CX}$ and $V_{CY}$ at nodes LX, CX and CY) are exemplarily shown in FIGS. 6A-6C.

TABLE 2

Voltage rating of the switching devices of the converters 500 and 700.

| | | $V_{DS\_max}$ | |
|---|---|---|---|
| Switch | Phase w/ $V_{DS\_max}$ | BuBo 500 | BuBo 700 |
| S1a | Bo/BuBo mag | $V_{OUT}$ | $V_{OUT}$ |
| S1b | BuBo demag | $V_{IN}$ | $V_{IN}$ |
| S2 | Bo/BuBo mag | $V_{IN} + V_{OUT}$ | $V_{IN}$ |
| S3 | BuBo demag | $V_{OUT}$ | $V_{OUT}$ |
| S4 | Boost mag | $V_{OUT}$ | $V_{OUT}$ |

Particularly, as can be clearly seen from the voltage ratings summarized for the power converter topology 500 as shown in the above Table 2, in comparison with those of Table 1, the voltage rating for switch S3 during the buck (or buck-boost) demagnetization phase is now reduced from $V_{IN}+V_{OUT}$ (in the power converter topology 200 of Table 1) to $V_{OUT}$ (in power converter topology 500 of Table 2).

However, it is noted that the voltage rating for switch S2 during the boost (or buck-boost) magnetization phase is nevertheless still maintained at $V_{IN}+V_{OUT}$ in both topologies 200 and 500, as shown in Tables 1 and 2, respectively. On the other hand, with the (improved) variant topology 700 of FIG. 7, this voltage rating, i.e., for switch S2 during the boost (or buck-boost) magnetization phase, is now also reduced from $V_{IN}+V_{OUT}$ (in the power converter topology 200 of Table 1 or the power converter topology 500 of Table 2) to $V_{OUT}$ (in the power converter topology 700 of Table 2).

As indicated above already, thanks to the reduced $V_{DS\_max}$ for the switches as shown in Table 2, switching devices with lower $R_{SP}$ can be used to lower silicon area while achieving higher $V_{OUT}$ for a given $R_{OUT}$ and $V_{IN}$, or lower $V_{IN}$ for a given $V_{OUT}$ and $R_{OUT}$.

The power converter topology 500 (and also 700) as proposed in the present disclosure also provides several additional advantages. For example, in the converters 500/700 of the present disclosure, the peak current-mode control scheme would generally be simpler to implement because it can rely on current sensing on switch S1b (see for example FIG. 5) where only $I_L$ flows during the boost magnetizing (as exemplified in FIG. 6A) and the buck-boost bypass/buck magnetizing phases (as exemplified in FIG. 6B). On the other hand, in the converter 200, both $I_{FLY}$ and $I_L$ would generally flow through switch S1 during the buck-boost bypass/buck magnetizing phase (as exemplified in FIG. 3B).

It should be further noted that the (re-)charge current $I_{FLY}$ flows through S1a and S4 when $C_{FLY}$ is (re-)charged. Therefore, switch S1b can be used for current sensing when peak current-mode control is used. This is generally in contrast with the architecture 200 in FIG. 2 where both $I_L$ and $I_{FLY}$ flow in switch S1 during the boost magnetizing and buck magnetizing/buck-boost bypass phase (as exemplified in FIG. 3B). Furthermore, it is also to be noted that the hybrid buck-boost architecture 500 of FIG. 5 and the minor variant 700 of FIG. 7 generally have the same trade-off explained for the architecture 200 of FIG. 2 between $V_{OUT\_max}$ and $R_{OUT}$ because of the charge conservation on $C_{FLY}$, as will also be understood and appreciated by the skilled person.

Figure 9:
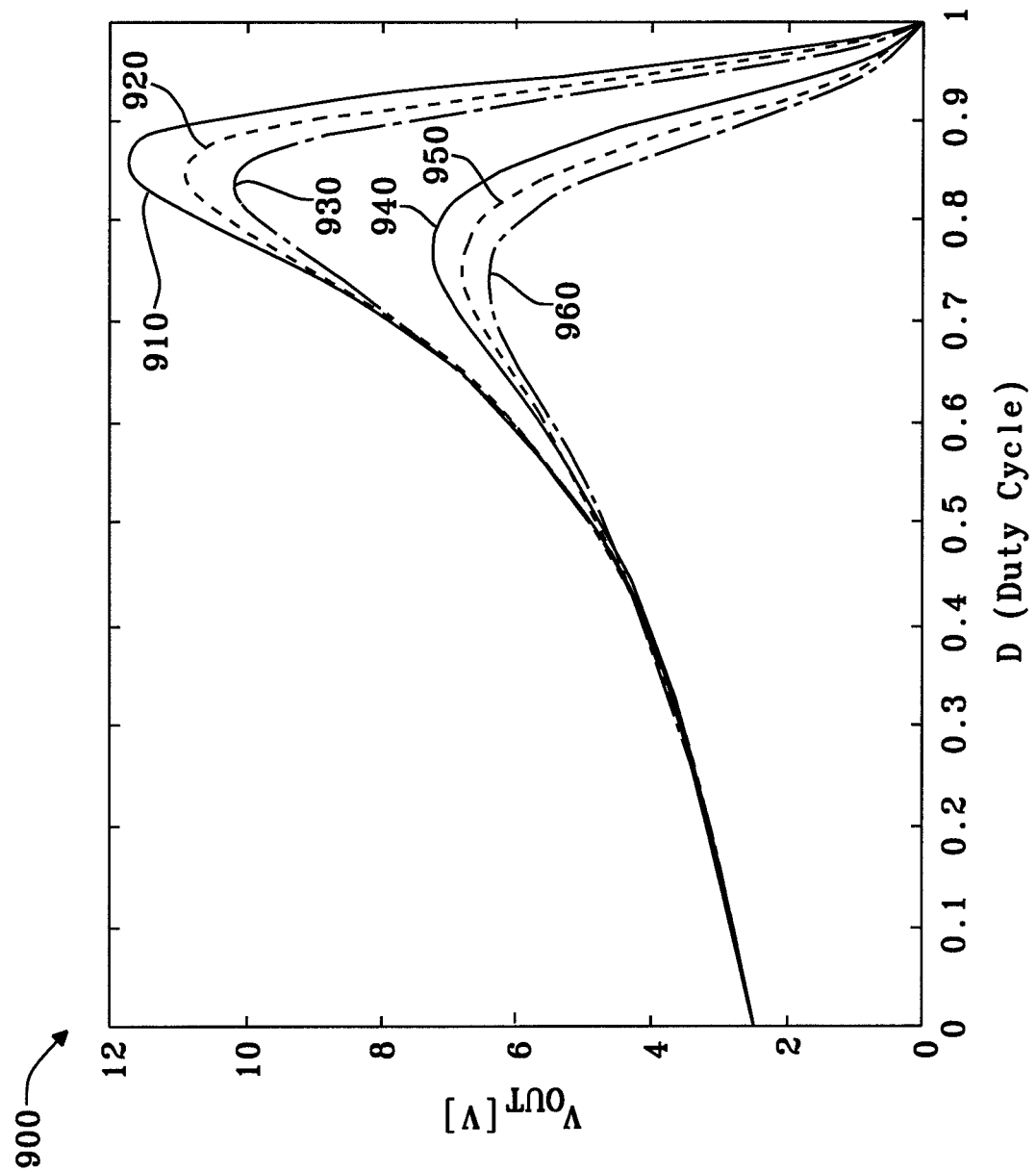

Similar to FIG. 4, FIG. 9 schematically illustrates an example of simulation results of the hybrid buck-boost power converter 700 of FIG. 7 in comparison with those of the hybrid buck-boost power converters 200 and 500 of FIGS. 2 and 5. Specifically, the exemplary simulation results in FIG. 9 mainly present comparison of the trade-off between $V_{OUT\_max}$ and $R_{OUT}$ for the converter topologies 200, 500 and 700 operated in boost mode. In particular, the simulations are performed in an analogous or similar manner as those in FIG. 4 (e.g., with the assumption of $V_{IN}$ of 2.5 V, DCR of 20 mΩ, ESR of 5 mΩ, etc.). The table below summarizes the impedance used for the different switches in the three topologies during the exemplary simulation. Since the three converters 200, 500 and 700 generally follow the same (or similar) operation phases, the impedance seen by the inductor current during each phase in the three converters 200, 500 and 700 is matched.

TABLE 3

Impedances used during the simulation of FIG. 9.

| | $R_{ON}$ [mΩ] | | |
|---|---|---|---|
| Switches | BuBo 200 | BuBo 500 | BuBo 700 |
| S1 | 20 | — | — |
| S1a | — | 10 | 10 |
| S1b | — | 10 | 10 |
| S2 | 20 | 20 | 10 |
| S3 | 20 | 10 | 10 |
| S4 | 20 | 20 | 10 |

To be more specific, it is started by assuming in the converter 200 the same impedance for all switches. The $R_{ON}$ of switches S1a and S1b is such that the path between $V_{IN}$ and node $L_X$ during the buck magnetizing phase has the same impedance of that exhibited in the converter 200 during the same phase. In the hybrid topologies 500 and 700 switch S3 is now in series with switch S1b during the boost magnetizing phase. Therefore, the impedance of switches S3 and S1b has been halved in the hybrid topologies 500 and 700. Finally, in the hybrid variant topology 700 the sum of switches S2 and S4 impedances is equal to the impedance of switch S4 in the converter 200. Therefore, the current path impedance during the buck demagnetizing phase is the same among the compared converters 200, 500 and 700.

As a result, in the examples of FIG. 9 diagrams 910 and 940 schematically show simulation results of the power converter 700 with $R_{OUT}$ being set to 20Ω and 5Ω, respectively; diagrams 920 and 950 schematically show simulation results of the power converter 500 with $R_{OUT}$ being set to 20Ω and 5Ω, respectively; and diagrams 930 and 960 schematically show simulation results of the power converter 200 with $R_{OUT}$ being set to 20Ω and 5Ω, respectively.

Notably, despite the devices used in the hybrid topologies 500 and 700 generally target smaller impedances, they occupy less silicon area because they can use switching devices (e.g., FETs) rated for lower $V_{DS}$ voltage, as illustrated above. That is, for ~30% lower area, the proposed hybrid converter 500 (or 700) may generally show that for the same $R_{OUT}$ and same $V_{IN}$ conditions the proposed hybrid converter 500 (or 700) may reach higher $V_{OUT\_max}$ values. For $R_{OUT}$=20Ω and $V_{IN}$=2.5 V, the proposed hybrid converter 500 (or 700) may achieve a $V_{OUT\_max}$ of ~0.74 V and ~1.6 V higher than that of the converter 200, respectively.

It is also to be noted that, even though not explicitly shown in the figures, in order for correctly operating the switching devices therein, the power converter topologies may further comprise a suitable control unit for generating the corresponding control signals, as will be understood and appreciated by the skilled person.

Figure 10:
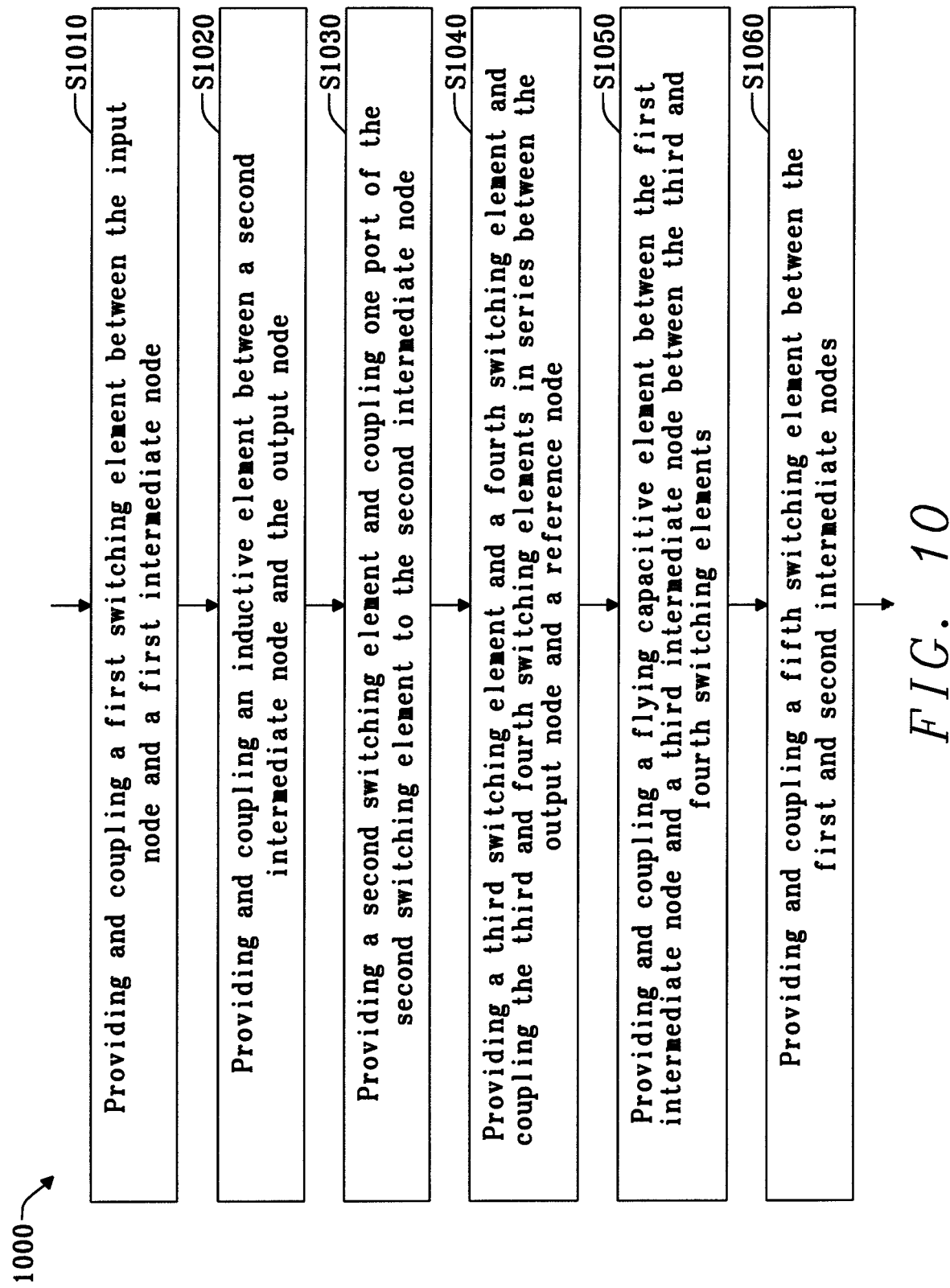
FIG. 10 is a flowchart schematically illustrating an example of a method of operating a hybrid buck-boost power converter according to embodiments of the disclosure.

Finally, FIG. 10 is a flowchart schematically illustrating an example of a method 1000 of operating a hybrid buck-boost power converter according to embodiments of the disclosure. The hybrid buck-boost power converter may correspond to the power converter 500 as shown in FIG. 5 or the power converter 700 as shown in FIG. 7. The method 1000 comprises, at step S1010, providing and coupling (e.g., connecting or directly coupling) a first switching element (or switching device) between the input node and a first intermediate node. The method 1000 further comprises, at step S1020, providing and coupling (e.g., connecting or directly coupling) an inductive element (e.g., an inductor) between a second intermediate node and the output node. The method 1000 yet further comprises, at step S1030, providing a second switching element and coupling (e.g., connecting or directly coupling) one port (or terminal) of the second switching element (e.g., a drain port of a MOSFET) to the second intermediate node. The method 1000 also comprises, at step S1040, providing a third switching element and a fourth switching element, and coupling (e.g., connecting or directly coupling) the third and fourth switching elements in series between the output node and a reference node. The reference node may be ground (GND), or any other suitable reference node, as will be understood and appreciated by the skilled person. In addition, the method 1000 also comprises, at step S1050, providing and coupling (e.g., connecting or directly coupling) a flying capacitive element (e.g., a flying capacitor) between the first intermediate node and a third intermediate node that is arranged between the third and fourth switching elements. Finally, the method 1000 comprises, at step S1060, providing and coupling (e.g., connecting or directly coupling) a fifth switching element between the first and second intermediate nodes. Notably, any switching elements/devices mentioned in this disclosure may be transistor devices, such as FETs, MOSFETs, etc., or any other suitable switching devices, as will be understood and appreciated by the skilled person.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of theses circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A power converter configured to generate an output voltage at an output node of the power converter based on an input voltage received at an input node of the power converter, the power converter comprising:
    a first switching element coupled between the input node and a first intermediate node;
    an inductive element coupled between a second intermediate node and the output node;
    a second switching element with one port being coupled to the second intermediate node;
    a third switching element and a fourth switching element coupled in series between the output node and a reference node;
    a flying capacitive element coupled between the first intermediate node and a third intermediate node between the third and fourth switching elements; and
    a fifth switching element coupled between the first and second intermediate nodes;
    wherein another port of the second switching element is coupled to the reference node;
    wherein the power converter further comprises a buck operation mode;
    wherein, during a magnetizing phase of the buck operation mode, the first, fourth and fifth switching elements are in an ON state, and the second and third switching elements are in an OFF state;
    wherein the flying capacitive element is charged during the magnetizing phase of the buck operation mode;
    wherein, during a demagnetizing phase of the buck operation mode, the first, second and fourth switching elements are in an ON state, and the third and fifth switching elements are in an OFF state;
    wherein the flying capacitive element is charged during the demagnetizing phase of the buck operation mode;
    wherein the power converter further comprises a boost operation mode;
    wherein, during a magnetizing phase of the boost operation mode, the third and fifth switching elements are in an ON state, and the first second and fourth switching elements are in an OFF state; and
    wherein, during a demagnetizing phase of the boost operation mode, the first, fourth and fifth switching elements are in an ON state, and the second and third switching elements are in an OFF state.

2. The power converter according to claim 1, wherein the inductive element is coupled to the capacitive element through the fifth switching element.

3. The power converter according to claim 1, wherein, during the demagnetizing phase of the buck operation mode, a voltage across the third switching element equals the output voltage.

4. A power converter configured to generate an output voltage at an output node of the power converter based on an input voltage received at an input node of the power converter, the power converter comprising:
    a first switching element coupled between the input node and a first intermediate node;
    an inductive element coupled between a second intermediate node and the output node;
    a second switching element with one port being coupled to the second intermediate node;
    a third switching element and a fourth switching element coupled in series between the output node and a reference node;
    a flying capacitive element coupled between the first intermediate node and a third intermediate node between the third and fourth switching elements; and
    a fifth switching element coupled between the first and second intermediate nodes;
    wherein another port of the second switching element is coupled to the third intermediate node;
    wherein the power convertor comprises a buck operation mode;
    wherein, during a demagnetizing phase of the buck operation mode:
    the first, second and fourth switching elements are in an ON state, and the third and fifth switching elements are in an OFF state; and
    wherein the flying capacitive element is charged during the demagnetizing phase of the buck operation mode.

5. The power converter according to claim 4, wherein the inductive element is demagnetized through the second and fourth switching elements that are serially coupled.

6. The power converter according to claim 4, wherein, during the demagnetizing phase of the buck operation mode, a voltage across the third switching element equals the output voltage.

7. The power converter according to claim 4, wherein, during a magnetizing phase of the boost operation mode of the power converter, a voltage across the second switching element equals the input voltage.

8. A method for operating a power converter for generating an output voltage at an output node of the power converter based on an input voltage received at an input node of the power converter, the method comprising:
    providing and coupling a first switching element between the input node and a first intermediate node;
    providing and coupling an inductive element between a second intermediate node and the output node;
    providing a second switching element and coupling one port of the second switching element to the second intermediate node;

providing a third switching element and a fourth switching element and coupling the third and fourth switching elements in series between the output node and a reference node;

providing and coupling a flying capacitive element between the first intermediate node and a third intermediate node between the third and fourth switching elements; and providing and coupling a fifth switching element between the first and second intermediate nodes;

coupling another port of the second switching element to the reference node;

wherein the method comprises providing a buck operation mode;

wherein, during a magnetizing phase of the buck operation mode of the power converter, switching the first, fourth and fifth switching elements to an ON state, and switching the second and third switching elements to an OFF state, for charging the flying capacitive element;

wherein, during a demagnetizing phase of the buck operation mode of the power converter, switching the first, second and fourth switching elements to an ON state, and switching the third and fifth switching elements to an OFF state, for charging the flying capacitive element, wherein the method further comprises providing a boost operation;

wherein, during a magnetizing phase of the boost operation mode of the power converter, switching the third and fifth switching elements to an ON state, and switching the first, second and fourth switching elements to an OFF state; and wherein, during a demagnetizing phase of the boost operation mode of the power converter, switching the first, fourth and fifth switching elements to an ON state, and switching the second and third switching elements to an OFF state.

9. A method for operating a power converter for generating an output voltage at an output node of the power converter based on an input voltage received at an input node of the power converter, the method comprising:

providing and coupling a first switching element between the input node and a first intermediate node;

providing and coupling an inductive element between a second intermediate node and the output node;

providing a second switching element and coupling one port of the second switching element to the second intermediate node;

providing a third switching element and a fourth switching element and coupling the third and fourth switching elements in series between the output node and a reference node;

providing and coupling a flying capacitive element between the first intermediate node and a third intermediate node between the third and fourth switching elements; and providing and coupling a fifth switching element between the first and second intermediate nodes;

coupling another port of the second switching element to the third intermediate node;

wherein the method further comprises providing a buck operation mode; and wherein, during a demagnetizing phase of the buck operation mode of the power converter, switching the first, second and fourth switching elements to an ON state, and switching the third and fifth switching elements to an OFF state, for charging the flying capacitive element.

10. The method according to claim 9, further comprising demagnetizing the inductive element through the second and fourth switching elements that are serially coupled.

11. The power converter according to claim 2, wherein, during the demagnetizing phase of the buck operation mode, a voltage across the third switching element equals the output voltage.

12. The power converter according to claim 5, wherein, during a magnetizing phase of the boost operation mode of the power converter, a voltage across the second switching element equals the input voltage.

13. The power converter according to claim 6, wherein, during a magnetizing phase of the boost operation mode of the power converter, a voltage across the second switching element equals the input voltage.

* * * * *